United States Patent
Kobashi et al.

[11] 3,724,210
[45] Apr. 3, 1973

[54] PUSH ROD MECHANISM FOR PARALLEL CYLINDERS

[75] Inventors: Uichiro Kobashi; Masahiro Kito, both of Kariya, Japan

[73] Assignee: Aisin Seiki Kabushiki Kaisha, Kariya, Japan

[22] Filed: Feb. 18, 1971

[21] Appl. No.: 116,365

[30] Foreign Application Priority Data

Feb. 20, 1970 Japan ............................. 45/15087
May 27, 1970 Japan ............................. 45/52005

[52] U.S. Cl. .............. 60/54.6 E, 60/54.6 R, 188/345
[51] Int. Cl. ................................................ F15b 7/00
[58] Field of Search .......... 60/54.5 R, 54.6 R, 54.5 E, 60/54.6 E; 287/53; 188/345

[56] References Cited

UNITED STATES PATENTS 2,596,119  5/1952  Blackman ........................ 60/54.6 E
2,857,584  10/1958  Gibson ............................. 60/54.6 E Primary Examiner—Edgar W. Geoghegan
Assistant Examiner—A. M. Zupcic
Attorney—Sughrue, Rothwell, Mion, Zinn & Macpeak

[57] ABSTRACT

This invention relates to a push rod type motion-transmitting mechanism including a main push rod and a pair of auxiliary push rods, said main push rod being mechanically connected with a foot-operated brake pedal and said auxiliary rods being operatively connected respectively with control pistons slidably mounted in dual and parallel control cylinders formed within a hydraulic brake pressure control assembly adapted for valvingly control the hydraulic pressure supply to automotive wheel brake cylinders through dual pressure supply means leading thereto. All the main and auxiliary push rods are arranged in parallel to each other. There is provided a floating intermediate motion-transmitting member, said main push rod and the auxiliary push rod pair being kept in pressure contact with said intermediate member from both sides thereof substantially in opposed arrangement.

The improvement resides in the specific configuration of rod end-receiving surfaces formed on said intermediate member, so as to transmit motion from said intermediate member to said auxiliary push rods substantially in the axial direction, regardless of occasional inclination or partial rotation of said member caused by, for instance, accidental disabling of one of the dual pressure liquid supply means on account of pipe bursting or the like cause. The specific configuration of the said surface is defined by a pseudo-involute curve situated inwardly of an ideal involute curve as a main working part of said surface.

6 Claims, 8 Drawing Figures

INVENTORS
UICHIRO KOBASHI
MASAHIRO KITO

BY Sughrue, Rothwell, Mion, Zinn & Macpeak
ATTORNEYS

FIG. 2
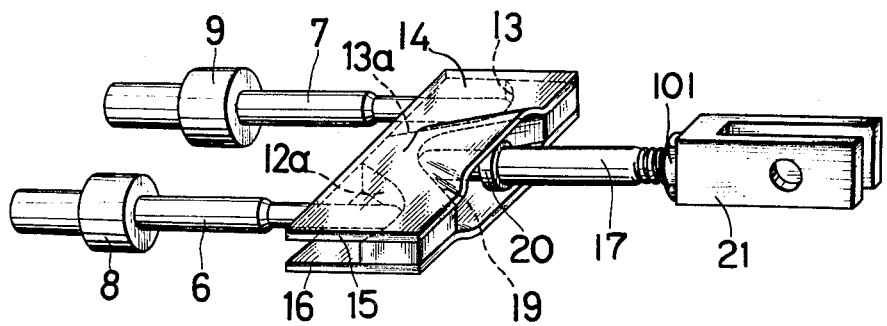
FIG. 3
FIG. 4
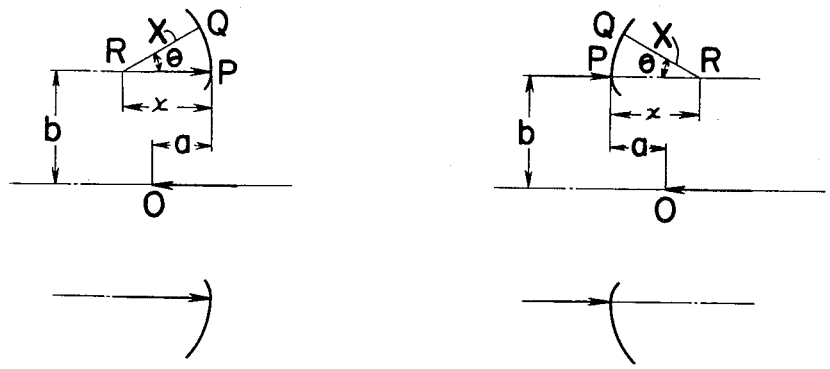
FIG. 5
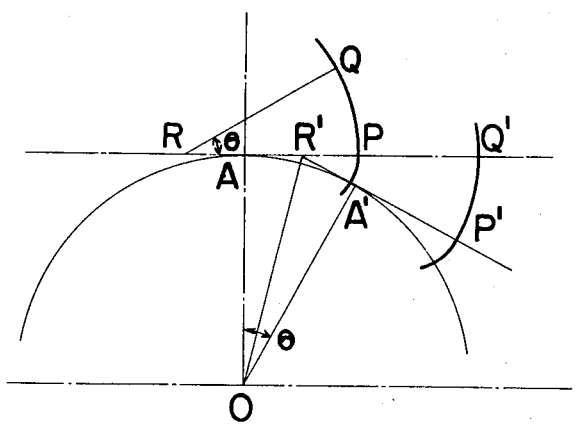

1

PUSH ROD MECHANISM FOR PARALLEL CYLINDERS

This invention relates to a push rod type motion-transmitting mechanism for dual hydraulic brake system, comprising a main push rod operatingly connected with a brake pedal or its equivalent means, a floating intermediate motion-transmitting member kept in pressure engagement with the other or inner end of said main push rod, and a pair of auxiliary push rods arranged in parallel to each other and operatively connected with respective pressure control pistons mounted slidably in dual parallel cylinders formed in a conventional brake control unit and having control valve means.

In this type brake pressure control mechanism, when one of the hydraulic brake systems should fail to operate, caused occasionally by a brake pipe bursting or the like accident, the related one of the auxiliary push rods will lose its moving stroke substantially entirely and the intermediate motion-transmitting member is rotated to a large degree. In such case, the motion or force transmitted from the main push rod through the intermediate member to the auxiliary push rods could not be transmitted thereto in a substantially different direction from the true and ideal axial direction. This disadvantageous phenomenon will invite a substantial and frictional bending action to the remaining or now working auxiliary push rod which is thus subjected to a severe and disadvantageous lateral force influencing adversely upon the desired brake pressure control action of the pressure control assembly.

Under extreme conditions, either the disabled or effectively working auxiliary piston may be brought into disengagement from pressure contact with the related rod end-receiving curved surface formed on the said intermediate member which may lead to a very dangerous accident to the driver on the automotive vehicle relying upon the brake pressure control unit under consideration.

The main object of the invention is to provide an efficient and highly improved push rod type motion-transmitting mechanism of the kind referred to which is capable of removing the aforementioned various conventional drawbacks with simple and reliable means.

In order to fulfil the aforementioned objects, the motion-transmitting mechanism for dual hydraulic brake system of the aforementioned type is characterized by that each of the rod end-receiving surfaces formed on said intermediate member and kept in pressure contact with the motion-receiving ends of said auxiliary push rods is defined by a curve which has a gradually increasing curvature when seen outwards from the normal contact point with the related auxiliary rod end and a slightly larger curvature throughout their length than that of a corresponding involute base circle tangent to the axes of said auxiliary push rods, and said working surface is defined preferably by a pseudo-involute curve.

Or alternatively, said working surface is defined by a curve to be determined by the formula:

$$x = a \pm \tan \theta/2$$

and within the anglular range of $90° \pm 11°$, the true meaning of said formula being to be described hereinafter.

2

This and further objects of the invention will appear more apparent when read the following detailed description of the invention by reference to the accompanying drawings illustrative of substantially two preferred embodiments of the invention. In the drawings:

FIG. 2 is a perspective view of essential parts of the mechanism shown in FIG. 1.

FIGS. 3 – 5 are explanatory graphs illustrative of the formation principles of the curved configuration of the auxiliary rod end receiving surface formed on said intermediate motion-transmitting member.

Figure 1:
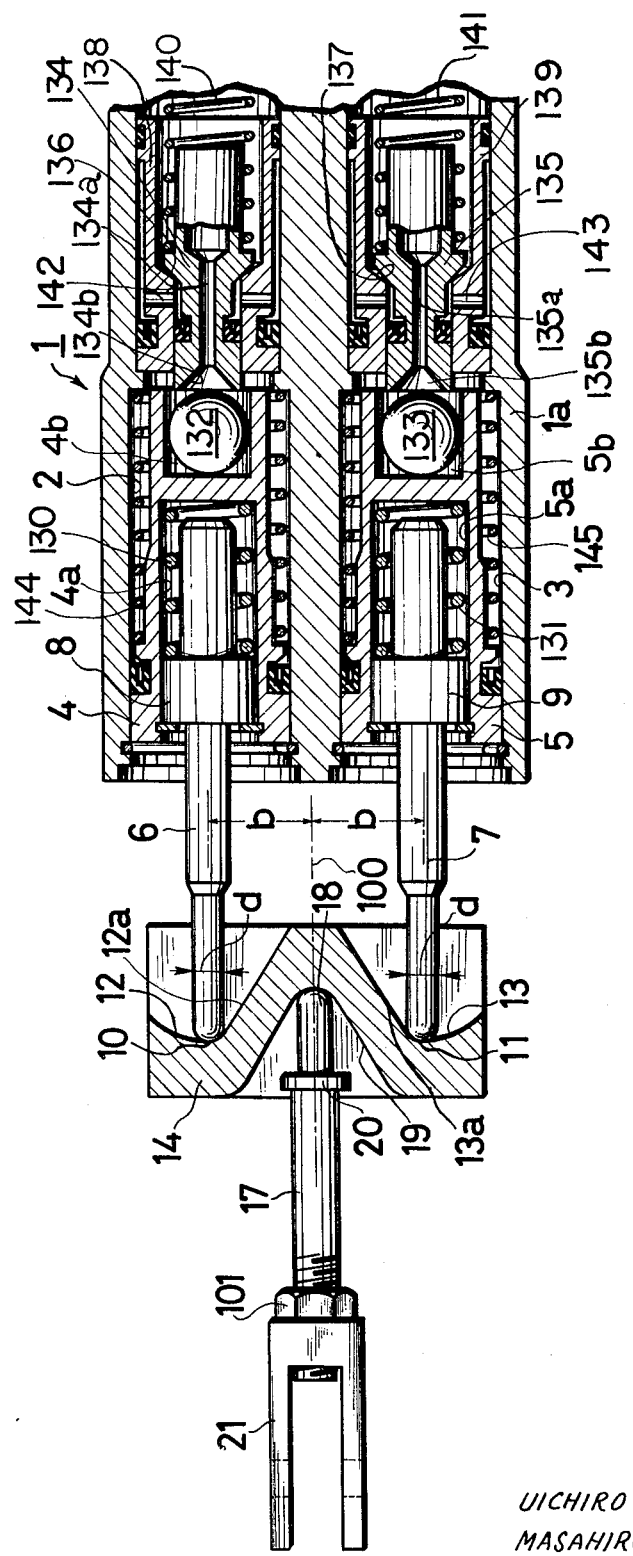
FIG. 1 is substantially an axial sectional view of substantial part of the first embodiment of the mechanism according to the present invention.

Referring now to FIG. 1 of the accompanying drawings, numeral 1 denotes generally a brake force control mechanism which comprises a stationary housing 1a formed therein with a pair of axially parallel cylinder bores 2 and 3. In these bores, motion-transmitting pistons 4 and 5 are slidably mounted, respectively. Numerals 6 and 7 represent push rods which extend into the respective blind bores 4a and 5a and are formed with respective guide collars 8 and 9 kept in slidable cooperation with the inner wall of the respective bores 4a and 5a.

An intermediate member 14 called "lever" is formed with a pair of concavely curved surfaces 12 and 13 symmetrically arranged relative to its central axis shown at 100 by a chain-dotted line in FIG. 1. The outer end of each of the push rods 6 and 7 has a spherical surface 10 or 11 and kept in pressure contact with the related one of said curved surface 12 or 13, said spherical surface being formed by a radius which corresponds to a half of the diameter $d$ of the related part of the respective rods 6 and 7. The extension 12a or 13a of the curved surface extending towards said axis 100 is rather steeper than the curved surface 12 or 13 and preferably formed substantially into a straight line or so.

As most clearly shown in FIG. 2, the intermediate member 14 is sandwiched by a pair of cover plates 15 and 16 fixedly attached thereto, so as to provide a movable intermediate means in its entirely. These cover plates 15 and 16 act as guide means for said rods 6 and 7.

On the left-hand side of the intermediate member 14, there is formed a concavely curved surface 19 kept pressure engagement with the right-hand end of main push rod 17, said end being shaped into equally a spherical form. The main push rod 17 is formed into a stepped bar, a resilient ring 20 is made of rubber or soft elastic plastic material being fixedly attached on a shouldered part of rod 17 formed by the stepped structure thereof, so as to provide a certain freedom in movement relative to said cover or guide plates 15 and 16.

At the left-hand end of main push rod 17, a connector 21 is attached fixedly by screw means 101, said connector being formed preferably into a fork member and mechanically connected to a conventional foot-operated brake pedal or its equivalent means, although not shown only for simplicity.

The mechanism so far described by reference to FIG. 1 may be understood more clearly by reference to FIG. 2 without further analysis.

The specific form of rod-receiving curved surfaces 12 and 13 on the intermediate member 14 will be described hereinbelow by reference to FIGS. 3 and 4.

The center-to-center distance between the main rod 17 and auxiliary rod 6 or 7 is represented by $b$ (cf. also FIG. 1).

The contact point between the auxiliary rod 6 and 7 and the related receiving curved surface 12 or 13 on the member 14 is represented by "P." The similar contact point between main rod 17 and curved surface 19 is represented by "O." The axial distance between these contact points P and O is represented by $a$.

Now taking a certain point R on the auxiliary rod 6 or 7, the distance between the points P and R is assumed to be $x$.

When the member 14 is inclined by a certain angle $\theta$ on the plane shown in FIG. 1, the point Q at which the rod 6 or 7 is brought into contact with the receiving curved surface 12 or 13 from the normal direction thereto can be determined by the formula $\theta$ given below.

$$x = a \pm b \tan \theta/2$$

The plus sign in this formula shows the case wherein the point Q will recede from main push rod 17. The minus sign represents the reversed case. The curved surface 12 or 13 can be formed so as to practically realize the ideal surface according to said formula.

The effect of the said kind of curved surface 12 or 13 realizing the said ideal curve will be explained in detail by reference to FIG. 5.

When the intermediate member 14 is rotated by an angle $\theta$, the point P will shift to P' and, Q to Q' and A to A', respectively. Now, draw a tangent at right angles to the line OA' and find an intersecting point R' with rod 6 or 7. Then, the following formula will be established.

$$R'P' = a + b \tan \theta/2$$

where, $\theta$ = the angle $P'R'Q'$ or, $RP = RQ = a + b \tan \theta/2$ where, angle $QRP = \theta$ The point $Q'$ which is found by rotating point $Q$ by the angle $\theta$ about the center point O, will be on the axis of push rod 6 or 7. Therefore, the rod 6 or 7 will contact with the receiving curved surface on member 14 at right angles or in the normal direction and force will act upon these rods along their respective axes. Disadvantageous laterally deflecting force will not act upon these auxiliary push rods.

In the following, the practically allowable range of said angle $\theta$ will be explained.

Generally speaking, the angle $\theta$ may differ depending on the specific structure and arrangement of the brake force controller, especially the mutual distance between the parallel cylinders and the stroke of the manual braking, and the like factors. From practical experiments, the angle $\theta$ may extend 50° at the maximum. An inclination of the auxiliary push rod by an angle larger than 50° must be avoided. It is very satisfactory by adopting such condition that although when the member 14 has been inclined, but there will appear no slip between the rods 6; 7 and the receiving surface 12; 13. Generally speaking, the frictional coefficient between metals as adopted for these related members will amount 0.07 – 0.2. With use of other material having a high frictional coefficient over 0.2, the rod 6 or 7 when inclined may not return to the original point by lateral sliding movement. Therefore, the maximum friction angle $\beta$ can be found from the following relation $$\tan \beta = 0.2$$

thus, $\beta = 11°$

Therefore, when member 14 has an inclination angle of less than 50°, the contact angle between the surfaces 12 or 13 and the end of rods 6 or 7 must preferably be within the angular range of $90° \pm 11°$.

Figure 6:
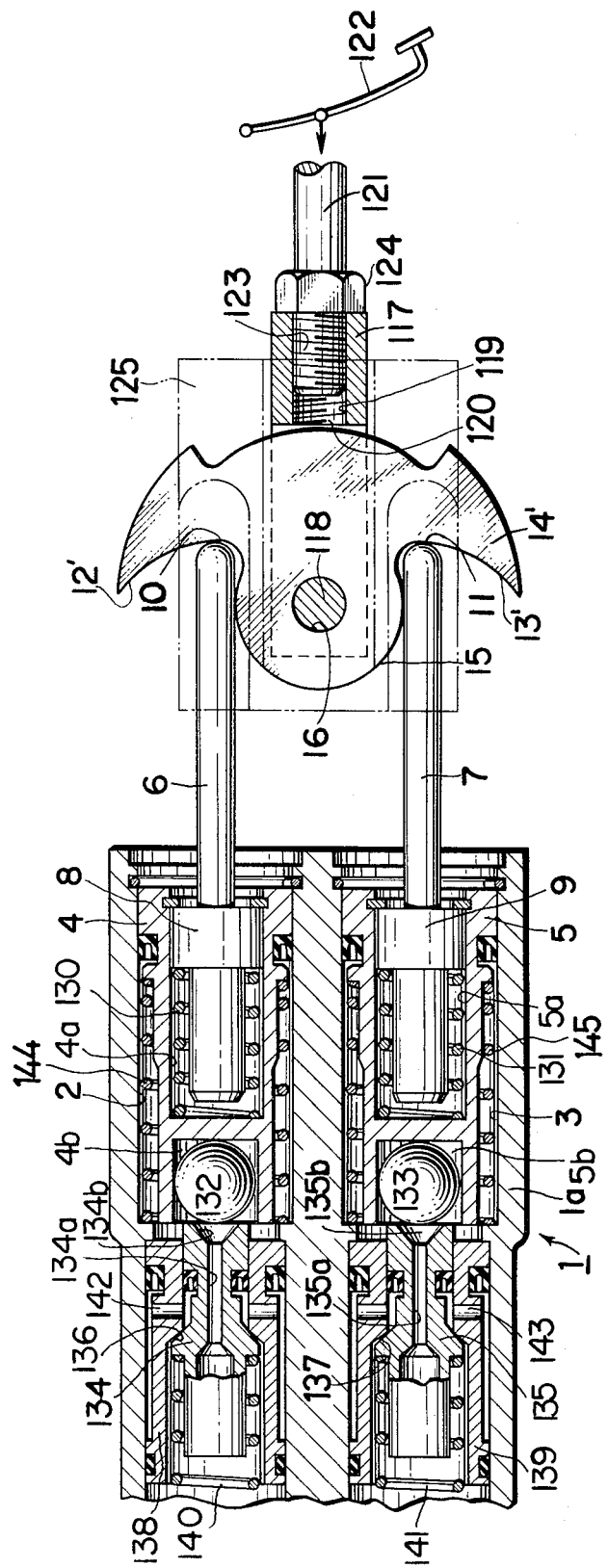
FIG. 6 is a substantially similar view to FIG. 1, yet illustrative of a second embodiment of the invention.
Figure 7:
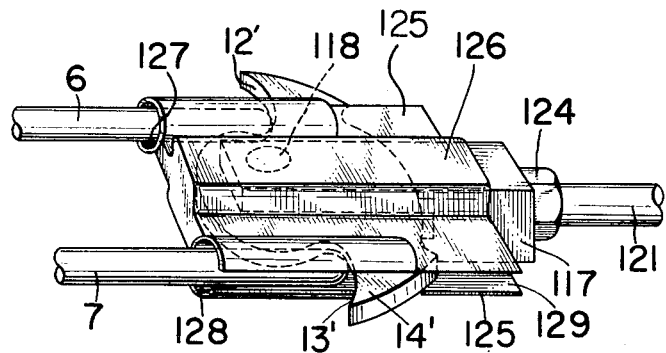
FIG. 7 is a perspective view of essential parts of the mechanism shown in FIG. 6.
Figure 8:
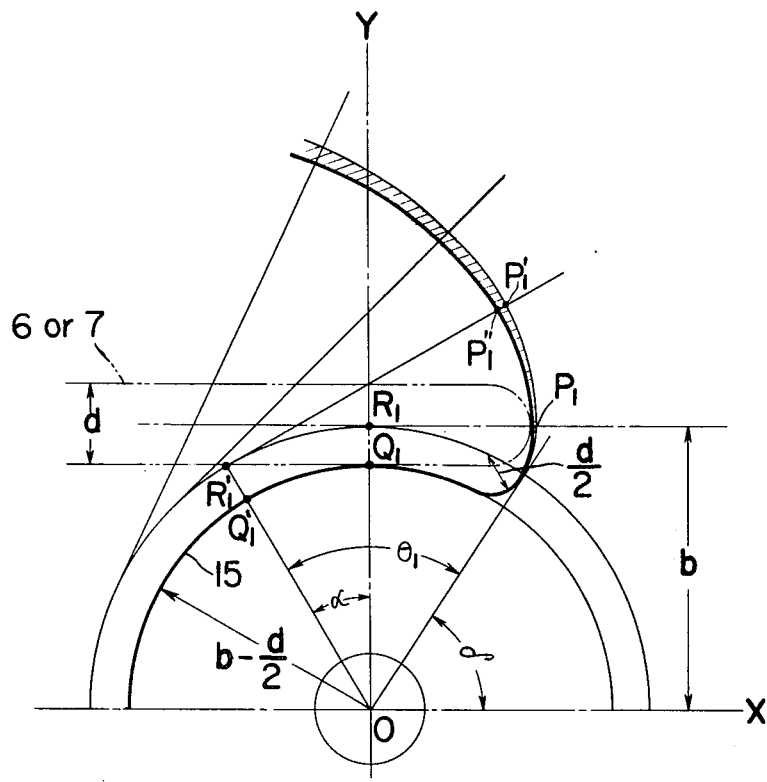
FIG. 8 is an explanatory diagram showing the forming principles of the auxiliary rod end-receiving curved surface formed on the intermediate floating member shown at 14' in FIGS. 6 and 7.

Further detailed parts employed in the present embodiment will become more apparent when considering the detailed description of the second embodiment shown in FIGS. 6-8.

In this second embodiment, numerals 1, 1a, 2 . . . . 11 represent respective similar parts as those employed in the foregoing first embodiment. The intermediate member 14' corresponds to that shown at 14 in the first embodiment, but it is substantially different therefrom especially in its general configuration. The member 14' has also a pair of concavely curved rod end-receiving surfaces 12' and 13' kept in pressure contact with the spherical rod ends 10 and 11, respectively. The member 14' has a rounded portion 15 formed concentrically with a pivot opening 16 and situated normally in the space defined by the rods 6 and 7 therebetween. The member 14' is further pivotably mounted on a clevis 117 by inserting a pivot pin 118 through said opening 16 and said clevis. Said member 14' can be defined as a cam means which feature may be applied to the member 14 in the first embodiment. Clevis 117 is formed with an axial hole 119 having female threads 120.

Numeral 121 represents a main push rod having male threads kept in mesh with said female threads 120. Push rods 121 corresponding to the combination of rod 17 and fork member 21, is linkedly connected to a conventional brake pedal, now appearing at 122 in FIG. 6. Fixing nut 124 is used for establishing a fixed connection between rod 121 and clevis 117. Guide means or cover 125 shaped generally into a plate and having an upwardly projecting and axially extending ridge 126 having an appreciable lateral width is provided as shown in FIG. 7. The clevis 117 is connected rigidly with the cover 125 by welding or the like fixing means. Since the cover 125 has no corresponding perforation so that the pivot pin 118 is prevented from otherwise possible disengagement from pivot opening 16.

The thus provided rigid assembly 117;125 is formed at its both sides with hollow tubular guide portions 127 and 128 for slidably receiving push rods 6 and 7, said hollow guide portions extending axially along substantially the left-hand half of the whole length of said assembly and being split axially at their outer sides, so as to allow additionally pivotal movement of said member 14'. Although not specifically shown, there is formed an inside hollow space within said assembly to encase substantial part of said member 14' and to allow it to perform a pivotal movement to a certain limited degree. At the both sides of said assembly, extending along substantially a right-hand half thereof when seen in FIG. 7, there are provided hollow spaces 129 (only seen at the side viewing towards the viewer) for allowing occasionally necessary pivotal movement of the member 14'. The vertical dimension, when seen in FIG. 7, of these spaces 129 is so selected that an excess and disadvantageous vertical movement of said member 14' is prevented thereby in a positive way.

Next referring to FIG. 8, the specific configuration of the rod end-receiving concavely curved surfaces 12' and 13' will be described more in detail hereinafter. In this Figure, represented in an orthogonal coordinate system, $b$ and $d$ are defined as before. The axis of abscissa O–X naturally extends along the axis of push rod 121 corresponding to that shown at 17;18 in FIG. 1. The axis of ordinate O–Y intersects at O with said axis O–X at right angles.

Now assume that the maximum allowable inclination angle of said member 14' be $(\pi/2 - \delta)$ radians and draw a semi-circle about the origin O with a radius equal to said distance $b$. Further assume that an involute curve is drawn from said semi-circle of radius $b$ at a position advanced by the angle "$\delta$" and on the first quadrant lying at the brake pedal side relative to the axis of ordinate O–Y. It will be obvious that this involute intersects at right angles with a tangent, now shown, drawn to said semi-circle and at the starting point of the involute.

It is further assumed that the member 14' has been rotated from the axis O–Y by an angle $\alpha$ clockwise on FIG. 8 and that $\theta_1$ equal to the sum of said angle $\alpha$ and the said maximum allowable inclination angle. Then, we will obtain the following coordinate relationship:

$x_1 = a \cos \delta (\cos \theta_1 + \theta_1 \sin \theta_1) - a \sin \delta (\sin \theta_1 - \theta_1 \cos \theta_1);$ and $y_1 = a \sin \delta (\cos \theta_1 + \theta_1 \sin \theta_1) + a \cos \delta (\sin \theta_1 - \theta_1 \cos \theta_1)$ The involute curve formed in accordance with the above formulas is represented by a thin or fine involute extending upwardly from said starting point and passing through a point $P_1$ in FIG. 8. When assumed that this involute defines the configuration of the curved surface 12', the other surface 13' is defined by forming a symmetrical involute relative to the axis of abscissa O–X, although not specifically shown and described. In practice, however, the practical surface 12' or 13' is formed by a pseudo-involute drawn somewhat inwardly from the ideal involute as represented by a thick curve passing a point $P_1''$ shown in FIG. 8.

The circular surface 15 (see FIG. 6) of the member 14' is defined by drawing a substantial circle around the origin O with a radius $[b - (d/2)]$. This basic circle and said pseudo-involute are connected with each other by inserting therebetween a small connecting circle with a maximum radius $2/d$. The overall configuration of the continuous complex curve consisting of part of said basic circle, part of said connecting circle and part of said pseudo-involute is shown in FIG. 8 by a single continuous thick curve. When, in practice, the member 14' is inclined by angle clockwise in FIG. 8, the contact point $P_1$ of the rounded end 10 or 11 of push rod 6 or 7 with the curved surface 12' or 13' on the member, respectively, will shift to $P_1'$. Contact points $R_1$ and $Q_1$ will shift to $R_1'$ and $Q_1'$, respectively. Since the straight line $P_1'R_1'$ is a tangent to the circle having a radius $b$, it intersects at $P_1'$ perpendicularly with the involute. The line $P_1'R_1'$ constitutes the axis of the rod 6 or 7.

As was referred to, the practical curved surface 12' or 13' is formed somewhat inwardly from the ideal involute curve (compare the thick practical or pseudo-involute with the fine ideal involute) so as to provide an inwardly directing laterally urging force to the push rod 6 or 7, regardless of inclined position of said member 14'.

Therefore, it will be seen that with the member 14' inclined clockwise in FIG. 8 by a certain angle $\alpha$, the contacting rod end will shift in practice to point $P_1''$. Therefore, push rod 6 or 7 is subjected always to an inwardly urging force so that the rod is kept in lateral pressure contact with, for instance, the point $Q_1'$ on the base circle 15. Although the radius of this base circle 15 is smaller $d/2$ than that for the circle having radius $b$, but these circles are concentric with each other and relative to the origin O. Therefore, the distance between the axis of said rod 6 or 7 and the axis of abscissa O–W will be a constant value equal to $b$, regardless of the inclination of the member 14'.

The structure and function of the brake pressure control mechanism *per se* shown at 1 of double cylinder type are similar to those of the conventional. But, in order to complete the description, the function thereof, together with its main constructional features so far as necessary to understand its operation, will be given hereinbelow, as a preparatory description of the functional features of the inventive arrangement.

When an automotive driver depresses the brake pedal 122, FIG. 6, axial pressure is transmitted therefrom through main push rod 121, nut 124, clevis 117, pivot 118 and intermediate motion-transmitting member 14' to the auxiliary push rods 6 and 7 which are thus moved axially. Motion is further transmitted from these rods through compression springs 130 and 131 contained in blind bores 4a and 5a, respectively, to motion-transmitting pistons 4 and 5 which are formed respectively with respective recesses 4b and 5b containing ball valves 132 and 133, respectively, being arranged for on-off control of the respective valve seats 134b and 135b leading to respective axial passage bores 134a and 135a kept in fluid communication with automotive wheel brake cylinders, not shown. Axial bores 134b and 135b are formed in respective movable valve slides 134 and 135, respectively, which are urged to move leftwards under the influence of backing springs 140 and 141, respectively.

Valve seat members 138 and 139 formed respectively with a plurality of lateral passages 142 and 143 are kept substantially at the shown position. For this purpose, these members 138 and 139 are urged respectively by a backing spring, not shown, arranged in the similar way to those at 140 and 141, respectively. Although not shown, lateral passage groups 142 and 143 are separately connected with a common outlet of a pump, not shown, or the respective outlets of duplicated pumps, or similar hydraulic pressure sources, not shown, for attaining a duplicated brake pressure liquid supply system, in order to realize a substantially absolute braking safety for the automotive vehicle in which the present mechanism included in the hydraulic brake system is mounted.

Between the valve seat member 138 or 139 and the valve member 134 and 135, there is formed valve seat means 136 or 137. The left-hand parts of duplicate cylinder bores 2 and 3, containing compression springs 144 and 145, respectively, are connected through respective discharge pipings, not shown, to a reservoir, not shown, which is hydraulically connected with the inlet side of said pump or pumps.

With leftward movement of the auxiliary push rods 6 and 7, valve members 4 and 5 are moved equally leftwards so that the respective valve seats 134b and 135b and, in addition, valve members 134 and 135 are moved leftwards slightly against the action of respective backing springs 140 and 141, respectively, so that pressure fluid is conveyed from lateral passage groups 134a and 135a through the now opened valve seat means 136 and 137 in a duplicated way of the wheel brake cylinders, not shown.

When the brake pedal 122 is released, all the related parts will be returned to the shown position so that valve seat means 136 and 137 are closed again, while the valve seat 134b and 135b are opened again. In this way, liquid pressure is conveyed from the wheel brake cylinders through axial bores 134a and 135a and the now opened valve seat 134b and 135b to the right-hand parts of the cylinder bores 2 and 3, FIG. 6, and released to the reservoir, not shown.

In this way, the wheel brake cylinders are brought into their non-service conditions.

The above general braking function is also applied to the first embodiment, although the directions of several main working parts are shown opposite to those shown in the second embodiment.

Even when, in an accident, one of the dual brake systems should fail to perform proper function on account of tube bursting or the like cause, and the intermediate motion-transmitting member 14' is situated thereby at a rotated position, force is transmitted nevertheless axially to the push rods 6 and 7 in an optimal way. For instance, when the brake system related with the push rod 6 fails to operate or this rod 6 performs a longer stroke movement than the other rod 7, pressure application upon the brake pedal 122 in its operating direction will cause the member 14' to rotate in counter clockwise direction in FIG. 6. In this case, since the working surfaces at 12' and 13' have specific configuration as was referred to hereinbefore, the rod ends 10 and 11 will slide on the respectively related curved surfaces 12' and 13'. respectively, and the relative frictional force will act upon these push rods 6 and 7 in such way that these rods are brought into pressure contact with the circular part 15 of the member 14'. Similar effect can be attained upon occasional clockwise rotation of the member 14'.

The practical working surface including the point $P_1''$ shown by a thick line in FIG. 8 has a substantially involute configuration as will be seen from the drawing. Or alternatively, the curve may be of the curve defined in the first embodiment by:

$$x = a \pm b \tan \theta/2.$$

As seen from the foregoing, the rod end-receiving surface 12, 12', 13 or 13' represents such a curve as having a gradually decreased curvature when seen from the normal contact point between the rod and the member 14 or 14', with the latter positioned in its regular perpendicular position relative to the axes of the rods 6, 7 and 17 or 121, towards outwards, and thus from the common axis of the whole mechanism. As seen, especially from FIG. 8, the practically working surface including said point $P_1''$ has an involute-like configuration slightly different from the corresponding ideal involute curve including the point $P_1'$. The working curve has thus a slightly larger curvature over its entire length than the related involute. In this way, the rods 6 and 7 are prevented from disengagement from the related rod end-receiving curves 12; 12' and 13; 13', even when the member 14 or 14' is rotated in either direction upon occasional failure of working of the related hydraulic brake unit by virtue of pipe bursting or the like cause.

Although not shown, the brake pedal 122 can be replaced by a hydraulically or the like boostable similar member as shown *per se*.

As will be seen from the foregoing, the working surface curve including the point $P_1'$ shown in FIG. 8 can be said a pseudo-involute curve.

The embodiments of the invention in which an exclusive property or priviledge is claimed are defined as follows:

1. In a push rod type motion-transmitting mechanism for a dual hydraulic brake system having a main force applying rod operatively connected with a brake force applying means, a floating intermediate motion-transmitting member kept in pressure engagement with one end of said main rod and with a pair of auxiliary push rods positioned parallel to each other and operatively connected with respective hydraulic brake pressure control pistons mounted slidably in parallel cylinders formed in a conventional brake pressure control unit, the improvement comprising said intermediate member having two rod end receiving surfaces formed thereon, each of the rod end-receiving surfaces formed on said intermediate member kept in pressure contact with the motion-receiving ends of said auxiliary push rods, said surfaces being defined by a curve having a gradually increasing radius of curvature in the outward direction from an imaginary contact point with an imaginary base circle, a radius of said base circle being equal to the perpendicular distance between the longitudinal center-line of one of said auxiliary push rods and the longitudinal center-line of said main rod, the center of said circle being located at the point of contact of the main rod with the intermediate member, the origin of said gradually increasing radius of curvature lying on the longitudinal axis of said auxiliary push rods and being measured along said longitudinal axis to the point of contact of said auxiliary push rod and said intermediate member.

2. The motion-transmitting mechanism as claimed in claim 1, wherein said gradually increasing radius of curvature is defined by an involute curve.

3. The motion-transmitting mechanism as claimed in claim 1, wherein said gradually increasing radius of curvature is defined by a curve determined by the formula:

$$X = a \pm b \tan \theta/2,$$

where $X$ = the radius of curvature and constitutes the distance on the longitudinal axis of said auxiliary rods between the contact point between an auxiliary rod and the rod end-receiving surface of said intermediate member and a point on said longitudinal axis of said auxiliary rod, $a$ = the longitudinal distance between the contact point between said main rod and said intermediate member and the contact point between an auxiliary rod and said intermediate member;

$b$ = the center-to-center distance between the longitudinal axis of said main rod and an auxiliary rod; and $\theta$ = the angle of inclination of said intermediate member having a maximum angular value of 50°.

4. The motion-transmitting mechanism as claimed in claim 1, wherein each of said rod end-receiving surfaces of said intermediate member includes a configuration to constantly urge said auxiliary rods to move inwardly, said intermediate member further including an arc-shaped portion for counter-acting against the urging force.

5. The motion-transmitting mechanism as claimed in claim 1, wherein the contacting point between said main rod and said intermediate member is positioned nearer said brake force applying pedal than the contact points between said auxiliary rods and said intermediate member.

6. The motion-transmitting mechanism as claimed in claim 1, wherein the contact point between said main rod and said intermediate member is positioned nearer said brake pressure control unit than the contact points between said auxiliary rods and said intermediate member.

* * * * *